US010564270B2

(12) United States Patent
Wang et al.

(10) Patent No.: US 10,564,270 B2
(45) Date of Patent: Feb. 18, 2020

(54) METHODS AND SYSTEMS FOR CALIBRATING SENSORS (71) Applicant: Caterpillar Inc., Peoria, IL (US)

(72) Inventors: Qi Wang, Pittsburgh, PA (US); Paul Edmund Rybski, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 711 days.

(21) Appl. No.: 15/097,423

(22) Filed: Apr. 13, 2016

(65) Prior Publication Data
US 2017/0299404 A1 Oct. 19, 2017

(51) Int. Cl.
G01S 7/497 (2006.01)
(52) U.S. Cl.
CPC .................. G01S 7/4972 (2013.01)
(58) Field of Classification Search
CPC .................................................. G01S 7/4972
See application file for complete search history.

(56) References Cited

U.S. PATENT DOCUMENTS

| 6,608,913 | B1 | 8/2003 | Hinton et al. |
| 7,499,775 | B2 | 3/2009 | Filippov et al. |
| 8,358,810 | B2 | 1/2013 | Roberts et al. |
| 8,862,423 | B2 | 10/2014 | Hukkeri et al. |
| 9,008,886 | B2 | 4/2015 | Braunstein et al. |
| 9,052,721 | B1* | 6/2015 | Dowdall .............. G05D 1/0272 |
| 9,170,334 | B2 | 10/2015 | Baldwin et al. |
| 9,201,424 | B1 | 12/2015 | Ogale |
| 2009/0202109 | A1* | 8/2009 | Clar ....................... G01C 15/00 382/104 |
| 2013/0000092 | A1 | 1/2013 | Hukkeri et al. |
| 2014/0228982 | A1* | 8/2014 | Bharwani .............. G05B 19/18 700/56 |
| 2015/0331111 | A1 | 11/2015 | Newman et al. |
| 2017/0220037 | A1* | 8/2017 | Berestov ............ G05B 23/0286 |

FOREIGN PATENT DOCUMENTS

| WO | 2014103683 | 7/2014 |
| WO | 2015106799 | 7/2015 |

* cited by examiner

Primary Examiner — Marc Anthony Armand
(74) Attorney, Agent, or Firm — Leydig, Voit & Mayer, LTD.

(57) ABSTRACT

A method for calibrating sensors devices mounted on a machine is disclosed. The method includes transforming a first 3D point cloud to generate a transformed first 3D point cloud based on an alignment of the first 3D point cloud with a 3D model of the machine. The first 3D point cloud includes 3D point cloud of one or more features of a terrain around the machine, and the machine. The method further includes aligning a second 3D point cloud with the transformed first 3D point cloud based on the one or more features of the terrain, to determine one or more transformation parameters. Thereafter, one or more calibration parameters for the second sensor device is extracted from the one or more transformation parameters. The second sensor device is calibrated based on the one or more calibration parameters.

12 Claims, 5 Drawing Sheets

METHODS AND SYSTEMS FOR CALIBRATING SENSORS

TECHNICAL FIELD

The present disclosure relates to methods and systems for calibrating sensors. More particularly, the present disclosure relates to methods and systems for calibrating sensors mounted on a machine operating at a worksite.

BACKGROUND

Machines such as haul trucks, excavators, motor graders, backhoes, water trucks, and other equipment, are utilized at a worksite to accomplish various tasks. With recent developments in the field of automation, automated machines have been developed that may operate at the worksite with minimal manual intervention. Usually, such automated machines utilize a plurality of sensors to determine operating conditions, at the worksite, such as a location of stationary objects, road conditions, and other machines operating at the worksite. Based on the determined operating conditions, the automated machine may operate at the worksite.

Due to dynamic and unpredictable operating conditions at the worksite, some of the sensors mounted on the machine may malfunction. Such malfunctioning sensors are replaced with new sensors by onsite workers/technicians. Before the new sensors are utilized to operate the machine, it may be required to calibrate them. Usually, the machine (with the newly installed sensor) is sent to a service station for the purpose of calibration of the new sensors. This in turn may slow down the work progress at the worksite.

U.S. Pat. No. 9,052,721 ('721 reference) discloses a system and a method for alignment of light detection and ranging (LIDAR) data. The '721 reference discloses a method to align a 3D point cloud, captured by a sensor mounted on the vehicle, with a reference 3D point cloud to avoid false detection of obstacles on the road. Further, the alignment of the two 3D point clouds may be utilized to determine yaw, pitch, and roll of the vehicle. However, the '721 reference is silent on calibration of the sensor mounted on the vehicle.

Accordingly, the system and method of the present disclosure solves one or more problems set forth above and other problems in the art.

SUMMARY OF THE INVENTION

Various aspect of the present disclosure disclose a method for calibrating sensors devices mounted on a machine. The method includes transforming, by a controller, a first 3D point cloud, received from a first sensor device, to generate a transformed first 3D point cloud based on an alignment of the first 3D point cloud with a 3D model of the machine. The first 3D point cloud comprising 3D point cloud of one or more features of a terrain around the machine, and the machine. Further, the method includes aligning, by the controller, a second 3D point cloud, received from a second sensor device of the sensors devices mounted on the machine, with the transformed first 3D point cloud based on the one or more features of the terrain, to determine one or more transformation parameters. Furthermore, the method includes extracting, by the controller, one or more calibration parameters for the second sensor device from the one or more transformation parameters. Additionally, the method includes calibrating, by the controller, the second sensor device based on the one or more calibration parameters.

Certain aspects of the present disclosure disclose a calibration system for a machine. The calibration system includes a first sensor device configured to capture a first 3D point cloud comprising 3D point cloud of one or more features of a terrain around the machine, and the machine. Further, the calibration system includes a second sensor device, mounted on the machine, configured to capture a second 3D point cloud comprising 3D point cloud of the one or more features of the terrain around of the machine. A controller in the calibration system is configured to transform the first 3D point cloud to generate a transformed first 3D point cloud based on an alignment of the first 3D point cloud with a 3D model of the machine. Further, the controller is further configured to align the second 3D point cloud with the transformed first 3D point cloud based on the one or more features of the terrain, to determine one or more transformation parameters. Furthermore, the controller is configured to extract one or more calibration parameters for the second sensor device from the one or more transformation parameters. Thereafter, the controller is configured to calibrate the second sensor device based on the one or more calibration parameters.

One aspect of the present disclosure discloses a machine being operable on a worksite. The machine includes a transceiver configured to receive a first 3D point cloud from a first sensor device. The first 3D point cloud comprises 3D point cloud of one or more features of a terrain around the machine, and the machine. A second sensor device, mounted on the machine, configured to capture a second 3D point cloud comprising 3D point cloud of the one or more features of the terrain around the machine. The machine further includes a controller configured to transform the first 3D point cloud to generate a transformed first 3D point cloud based on an alignment of the first 3D point cloud with a 3D model of the machine. The controller is further configured to align the second 3D point cloud with the transformed first 3D point cloud based on the one or more features of the terrain, to determine one or more transformation parameters. Furthermore, the controller is configured to extract one or more calibration parameters for the second sensor device from the one or more transformation parameters. The second sensor device is calibrated based on the one or more calibration parameters.

DETAILED DESCRIPTION

Figure 1:
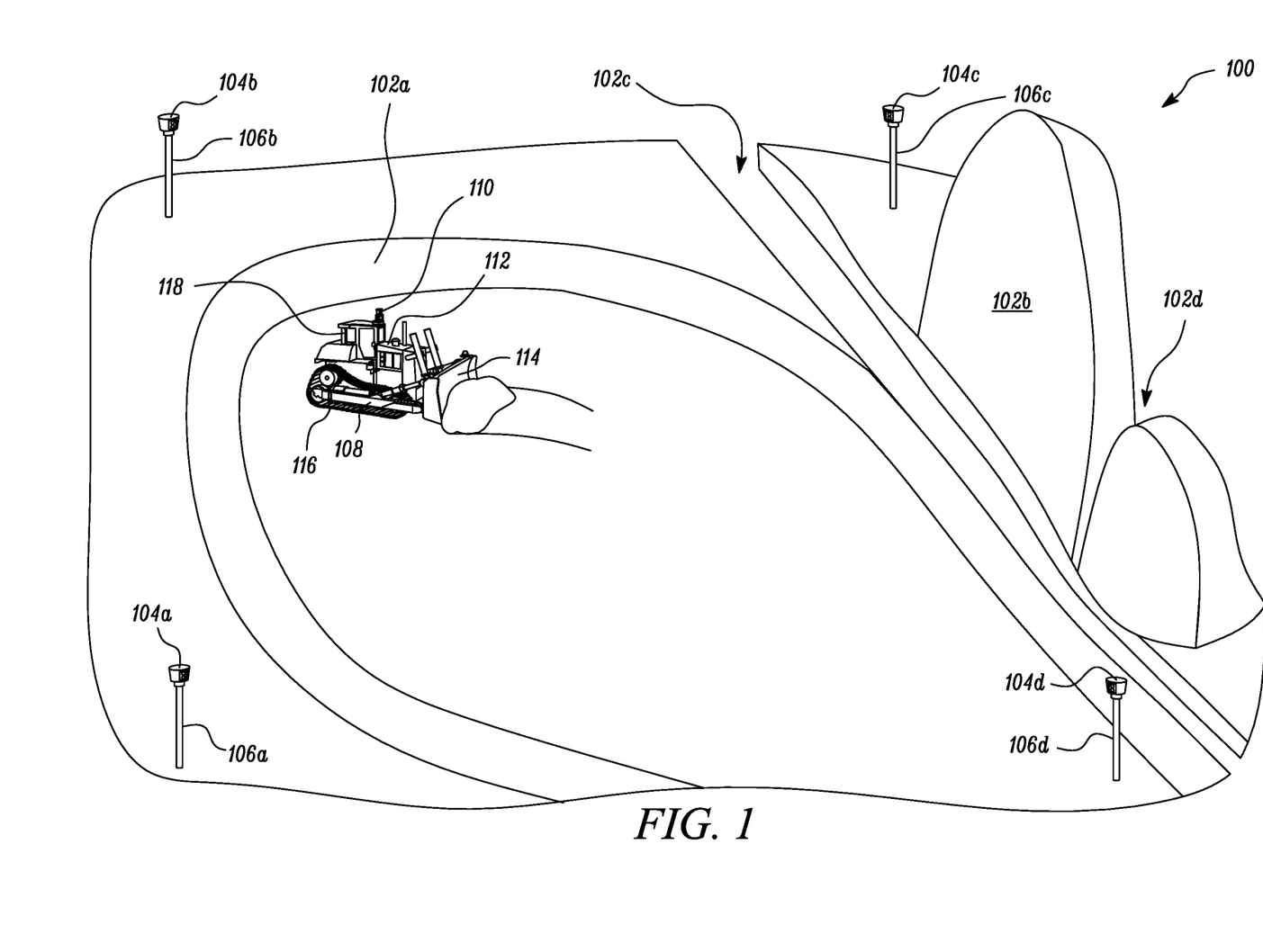
FIG. 1 illustrates an exemplary worksite, in accordance with the concepts of the present disclosure.

Referring to FIG. 1, an exemplary worksite 100 is illustrated. In an embodiment, the worksite 100 may correspond to a mining site, a construction site, or any other site where a machine is used to perform a task. The worksite 100 has a terrain having one or more features. In an embodiment, the one or more features may correspond to a landmark or an object that is recognizable in the worksite 100. In an embodiment, the one or more features of the terrain include, but are not limited to, berms (represented by 102a), highwalls (represented by 102b), diches (represented by 102c), crest (represented by 102d), and/or the like. A person having ordinary skills in the art would understand that the scope of the disclosure is not limited to the terrain having the aforementioned one or more features. In an embodiment, the one or more features of the terrain may vary based on a type of the worksite 100. The worksite 100 includes one or more first sensor devices 104a, 104b, 104c, and 104d installed at one or more predetermined locations 106a, 106b, 106c, and 106d in the worksite 100, respectively. For the sake of brevity, a single first sensor device 104a has been considered for describing the disclosure. However, the functions of the first sensor device 104a may be contemplated for the other first sensors of the one or more first sensor devices 104b, 104c, and 104d. Further, the worksite 100 includes a machine 108, and a second sensor device 110. In an embodiment, the second sensor device 110 is mounted on the machine 108.

In an embodiment, the first sensor device 104a corresponds to a device that is configured to record data pertaining to the worksite 100. In an embodiment, the first sensor device 104a is installed at the predetermined location 106a, which is at a predetermined distance from the machine 108. In an embodiment, the predetermined distance is selected such that first sensor device 104a is able to capture the image of the machine 108. The first sensor device 104a is configured to generate a first 3D point cloud. In an embodiment, a 3D point cloud corresponds to a three dimensional coordinate system, where each location on the worksite 100 is represented by a point in the 3D point cloud. Further, each point in the 3D point cloud has an associated coordinate. In an embodiment, the first 3D point cloud includes 3D point cloud of the machine 108 and the one or more features of the terrain (for example, the highwall 102b) around the machine 108. The first 3D point cloud has been described later in conjunction with FIG. 5. In an embodiment, the first sensor device 104a may utilize one or more known technologies such as, but are not limited to, contact based scanning, time of flight, and triangulation, to generate the first 3D point cloud. Some examples of the first sensor device 104a include, but are not limited to, a light detection and ranging (LIDAR) sensor, a perception sensor, a mono camera sensor, a stereo camera sensor, or a three-dimensional (3D) radar sensor.

Although not limited, the first sensor device 104a installed at the predetermined location 106a. In an embodiment, the first sensor device 104a may be mounted on an unmanned aerial vehicle (UAV). In such a scenario, the UAV is maneuvered around the worksite 100. Concurrently, the first sensor device 104a, mounted on the UAV, scans the worksite 100 to generate the first 3D point cloud. In an alternate embodiment, a technician or a worker may carry the first sensor device 104a around the worksite 100. Concurrently, the first sensor device 104a may scan the worksite 100 to generate the first 3D point cloud.

The machine 108 corresponds to a dozer that includes the second sensor device 110, an engine system 112, an implement 114, traction devices 116, and an operator cabin 118. A person having ordinary skills in the art will appreciate that the scope of the disclosure is not limited to the machine 108 as the dozer. In an embodiment, the machine 108 may correspond to any other type of machine.

The second sensor device 110 is mounted on the machine 108. For example, the second sensor device 110 is mounted on the operator cabin 118. However, the scope of the disclosure is not limited to the second sensor device 110 mounted on the operator cabin 118. Other positions of the second sensor device 110 on the machine 108 may be contemplated. In an embodiment, initially, the second sensor device 110 is uncalibrated. The second sensor device 110 is configured to scan the terrain around the machine 108 to generate a second 3D point cloud. In an embodiment, the second 3D point cloud includes 3D point cloud of the one or more features of the terrain (for example, the highwall 102b) around the machine 108. The second 3D point cloud is described later in conjunction with FIG. 5. In an embodiment, the second sensor device 110 may utilize one or more known technologies such as, but are not limited to, contact based scanning, time of flight, and triangulation to generate the second 3D point cloud. Some examples of the second sensor device 110 may include, but are not limited to, a light detection and ranging (LIDAR) sensor, a perception sensor, a mono camera sensor, a stereo camera sensor, or a three-dimensional (3D) radar sensor.

The engine system 112 may be based on one of the commonly applied power-generation units, such as an internal combustion engine (ICE). The engine system 112 may include a V-type engine, in-line engine, or an engine with different configurations, as is conventionally known. Although not limited, the engine system 112 may be a spark-ignition engine or a compression ignition engine, which may be applied in construction machines, such as the machine 108. However, aspects of the present disclosure, need not be limited to a particular engine type.

The implement 114 may correspond to a blade that is connected to a frame of the machine 108 through one or more actuators. In an embodiment, the implement 114 may be utilized to lift or carry heavy objects from one place to another. In certain scenarios, the implement 114 may be utilized to push objects, shove sand, debris and soil. A person ordinary skilled in the art would appreciate that the scope of the disclosure is not limited to the implement 114 as the blade. In an embodiment, the implement 114 may correspond to any hydro-mechanical work tool such as, but not limited to, auger, backhoe, bale spear, broom, clam shell bucket, demolition shear, and equipment bucket.

The traction devices 116 may also be referred to as a transport mechanism of the machine 108, and may constitute a set of crawler tracks. The set of crawler tracks may be configured to transport the machine 108 from one location to another. Generally, there are two crawler track units provided for the machine 108, with each crawler track unit being suitably and individually provided on the respective sides of the machine 108. In certain implementations, the transport mechanism of the machine 108 may include wheeled units (not shown) as well. The wheeled units may be provided either in combination with the crawler tracks or may be present on the machine 108 as stand-alone entities.

The operator cabin 118 houses various components and controls of the machine 108 that are meant for the machine's movement and operation on the worksite 100. The operator cabin 118 is also able to accommodate one or more operators during the operation of the machine 108, although it may be contemplated that the machine 108 being autonomous, is operable without the operator cabin 118. The operator cabin 118 may include varying levels of automation, such as manual operation with operator assist systems, remotely operated, remotely supervised, or entirely autonomous systems. The operator cabin 118 may include display units, control arms, levers, and steering mechanisms, (not shown) which correspond to various functionalities of the machine 108. Further, operator seating and stationing provisions, heating ventilation and cooling (HVAC) systems, and multiple other known provisions may be included within the operator cabin 118. Display units may be provided within the operator cabin 118 to ascertain a visual data pertaining to a terrain in the immediate vicinity of the machine 108. Alternatively, display units may be provided remotely to enable operators, supervisors, site inspectors, and even automated controllers of the machine 108, to monitor a pace and a nature of the machine's operation on the worksite 100.

Figure 2:
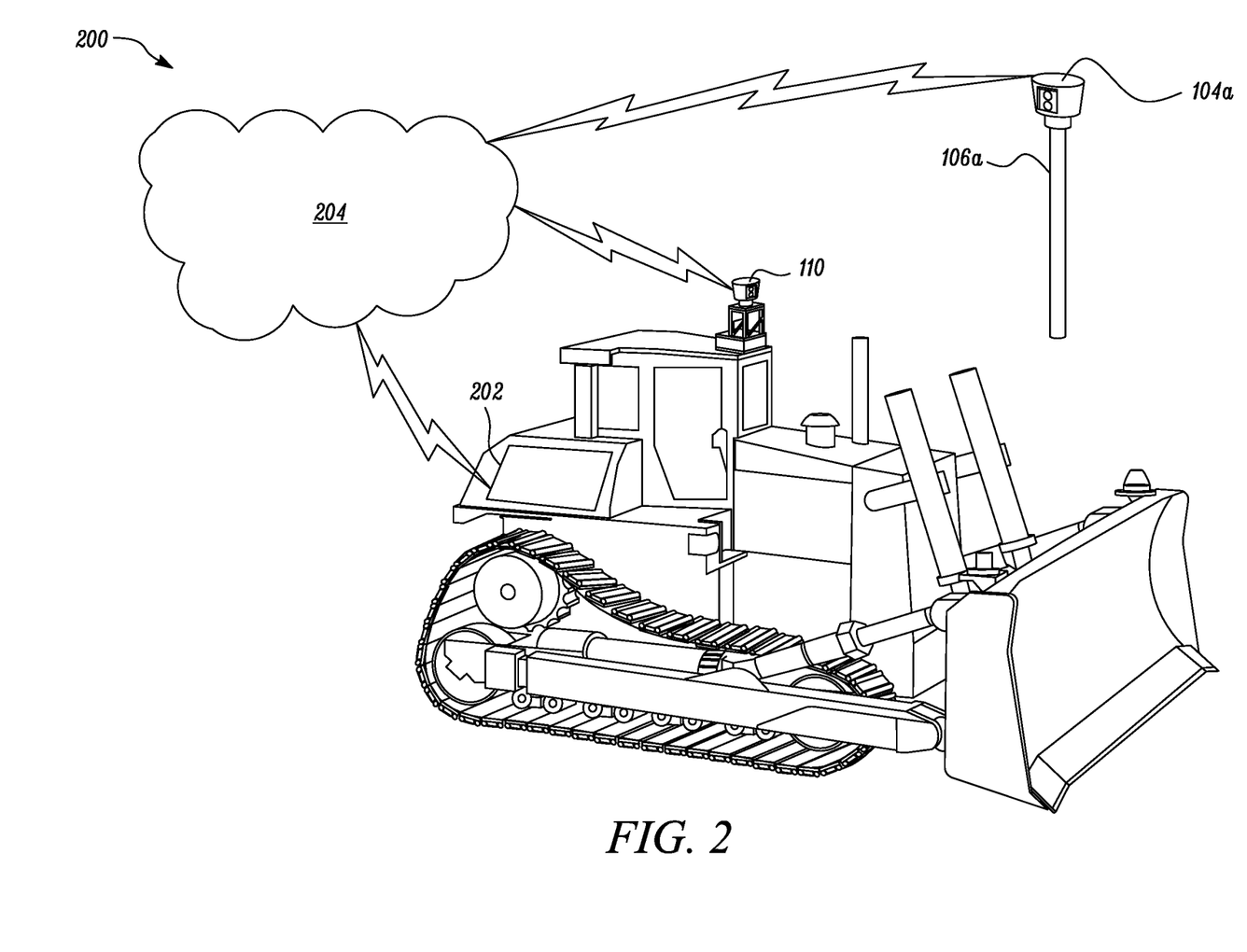
FIG. 2 illustrates a schematic of a calibration system, in accordance with the concepts of the present disclosure.

Referring to FIG. 2, a schematic of a calibration system 200 is illustrated. The calibration system 200 is described in conjunction with FIG. 1. The calibration system 200 comprises a controller 202, the first sensor device 104a, the second sensor device 110, and a network 204.

In an embodiment, the controller 202 may be located on the machine 108. In an embodiment, the controller 202 is configured to control one or more parameters of sub-systems of the machine 108. The controller 202 is connected to the second sensor device 110, mounted on the machine 108, through wired or wireless connection. In alternate embodiment, the controller 202 is connected to the second sensor device 110 through the network 204. Further, the controller 202 connects to the first sensor device 104a through the network 204. In an embodiment, the controller 202 is configured to calibrate the second sensor device 110. The process of calibrating the second sensor device 110 has been described later in conjunction with FIG. 3. In an embodiment, the controller 202 may correspond to an Engine Control Unit (ECU) of the machine 108. In alternate embodiment, the controller 202 may correspond to a separate computing device installed in the machine 108 for the purpose of controlling and calibrating the second sensor device 110. However, scope of the disclosure is not limited to having the controller 202 installed in the machine 108. In an embodiment, the functionalities of the controller 202 may be implemented on an application server (not shown) installed at a remote location. The application server may be configured to control the functionalities of the machine 108, remotely. Further, the application server may be configured to calibrate the second sensor device 110, remotely. In an embodiment, the controller 202 may include a processor, a memory device, and a transceiver. The processor may correspond to a microprocessor or a micro controller that is configured to execute the instructions stored in the memory device to perform predetermined task. In an embodiment, the memory device corresponds to a storage unit that is configured to store the instructions, which when executed by the processor performs the predetermined task. In an embodiment, the transceiver is configured to transmit and receive data from the first sensor device 104a and the second sensor device 110 through the network 204. For example, the transceiver receives the first 3D point cloud and the second 3D point cloud from the first sensor device 104a and the second sensor device 110, respectively.

In an embodiment, the network 204 may correspond to a communication medium through which the controller 202, the first sensor device 104a, and the second sensor device 110, may communicate with each other. Such a communication may be performed in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The network 204 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 3:
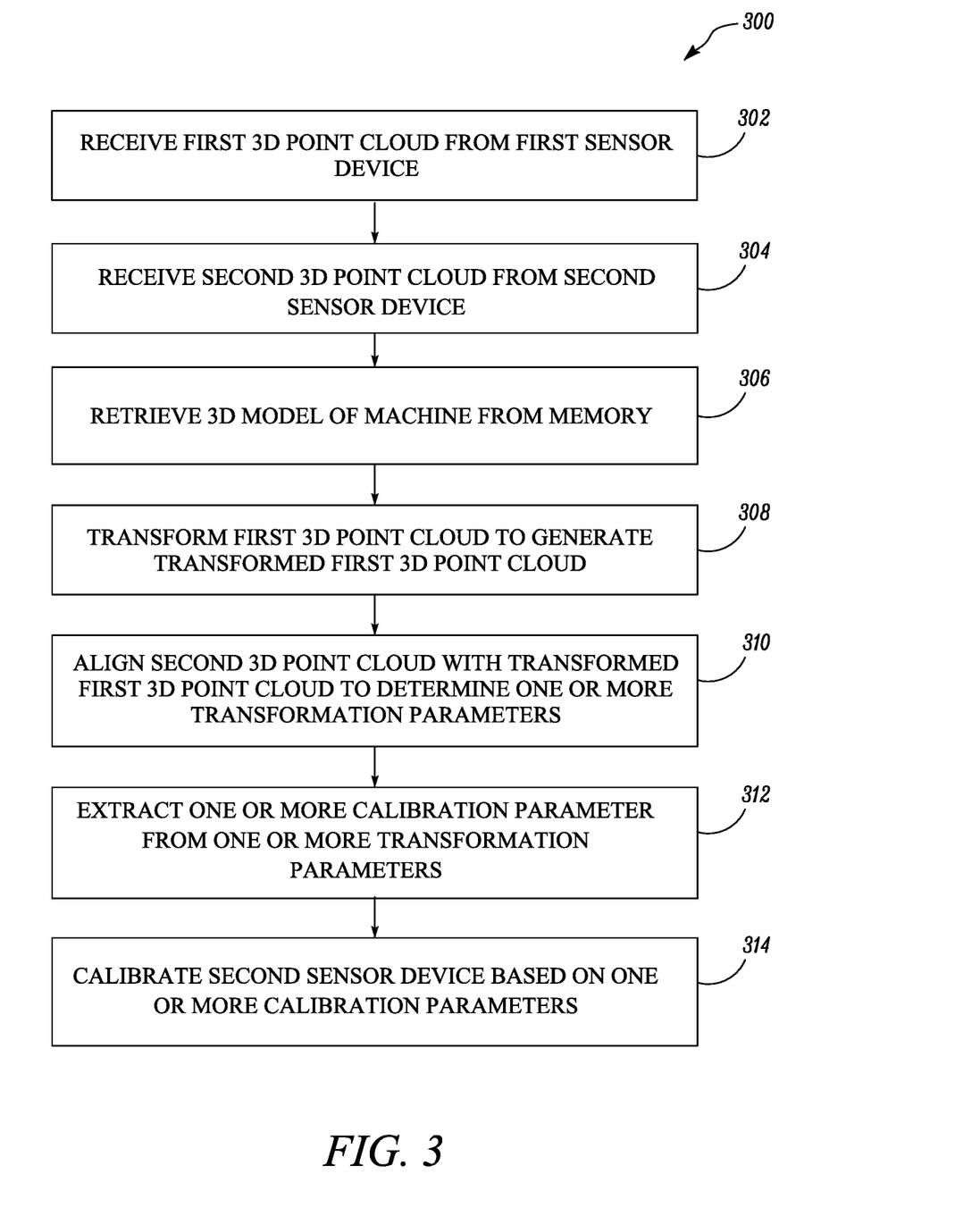
FIG. 3 illustrates a flowchart illustrating a method of calibrating a sensor mounted on a machine, in accordance with the concepts of the present disclosure.

Referring to FIG. 3, a flowchart 300 is illustrated. The flowchart 300 is described is described in conjunction with FIG. 1, and FIG. 2.

At step 302, the first 3D point cloud is received from the first sensor device 104a. In an embodiment, the controller 202 is configured to receive the first 3D point cloud from the first sensor device 104a. Prior to receiving the first 3D point cloud, the controller 202 instructs the first sensor device 104a to scan the worksite 100. As discussed supra that the first sensor device 104a is installed at predetermined location 106a in the worksite, which is at the predefined distance from the machine 108. Therefore, during scanning of the worksite 100, the first sensor device 104a is able to scan the machine 108 parked in the worksite 100 along with the terrain around the machine 108. Thereafter, the first sensor device 104a maps various objects in the worksite 100 in a three dimensional coordinate plane to create the first 3D point cloud. In an embodiment, each object in the worksite 100 is represented by a coordinate in the first 3D point cloud. For example, a first corner of the roof of the operator cabin 118 may be represented by coordinate (x1, y1, z1) in the first 3D point cloud. Similarly, a peak of the highwall 102b may be represented by the coordinate (x2, y2, z2) in the first 3D point cloud. In an embodiment, the first sensor device 104a may generate the first 3D point cloud in a first coordinate system. In an embodiment, the first coordinate system may correspond to a LIDAR coordinate system or a GPS coordinate system. In an embodiment, when the first coordinate system corresponds to the GPS coordinate system, coordinates of various objects in the 3D point cloud are represented in latitude and longitude. After the first 3D point cloud is generated by the first sensor device 104a, the first sensor device 104a transmits the first 3D point cloud to the controller 202.

At step 304, the second 3D point cloud is received from the second sensor device 110. In an embodiment, the controller 202 is configured to receive the second 3D point cloud from the second sensor device 110. Prior to receiving the second 3D point cloud, the controller 202 instructs the second sensor device 110 to scan the worksite 100. As discussed supra, the second sensor device 110 may be initially uncalibrated. Therefore, the uncalibrated second sensor device 110 scans the worksite 100.

Those ordinary skilled in the art would appreciate that the scope of the disclosure is not limited to receiving the first 3D point cloud and the second 3D point cloud from the first sensor device 104a and the second sensor device 110, respectively. In an embodiment, when the first sensor device 104a and the second sensor device 110 corresponds to an image capturing device, a first image of the worksite 100 and a second image of the worksite 100 is received respectively. In an embodiment, the first image and the second image corresponds to 2D representation of the worksite 100.

As the second sensor device 110 is mounted on the machine 108, the second sensor device 110 is only able to scan the terrain around the machine 108. Based on the scanning of the worksite 100, the second sensor device 110 generates the second 3D point cloud. As the second sensor device 110 is only able to scan the terrain around the machine 108, the second 3D point cloud so generated includes 3D point cloud of the terrain around the machine 108. In an embodiment, the second 3D point cloud does not include the 3D point cloud of the machine 108. In an embodiment, the second 3D point cloud is represented in a second coordinate system. In an embodiment, the second coordinate system may correspond to a LIDAR coordinate system or a GPS coordinate system. As discussed in conjunction with step 302, each object scanned by the second sensor device 110 is represented as a coordinate in the second 3D point cloud.

At step 306, the 3D model of the machine 108 is retrieved from the memory device. In an embodiment, the controller 202 is configured to retrieve the 3D model of the machine 108 from the memory device in the controller 202. In an embodiment, the 3D model of the machine 108 may correspond to a production model of the machine 108. In an embodiment, the 3D model defines exact dimensions of the machine 108. In an embodiment, the 3D model of the machine 108 is represented in a machine coordinate system. Further, in the 3D model of the machine 108, each structural feature of the machine 108 is represented in machine coordinates. For example, the 3D model of the machine 108 may define coordinates of the frame of the machine 108. In another example, the 3D model of the machine 108 may define coordinates of the corner of the operator cabin 118. In an embodiment, the coordinates of the structural features of the machine 108, defined in the 3D model of the machine 108, corresponds to the one or more features associated with the 3D model.

At step 308, the first 3D point cloud is transformed to generate a transformed first 3D point cloud. In an embodiment, the controller 202 is configured to transform the first 3D point cloud. In an embodiment, the controller 202 may align the first 3D point cloud with the 3D model of the machine 108. The controller 202 performs the alignment of the first 3D point cloud and the 3D model of the machine 108, based on the one or more features of the 3D model of the machine 108 (i.e., coordinates of the structural features of the machine 108 defined in the 3D model of the machine 108). As discussed supra, the first 3D point cloud includes the 3D point cloud of the machine 108. Therefore, to align the first 3D point cloud and the 3D model, the controller 202 identifies common points representing the same object (i.e., the machine 108) in both the first 3D point cloud and the 3D model of the machine 108. In an embodiment, controller 202 identifies a point representing a structural feature of the machine 108, in both the 3D model of the machine 108 and the first 3D point cloud. For example, the controller 202 may identify the corner of the roof of the operator cabin 118 as common point in both the 3D model of the machine 108 and the first 3D point cloud. However, the scope of the disclosure is not limited to the corner of the roof of the operator cabin 118 being identified as the common structural feature. In an embodiment, any structural feature that corresponds to the frame of the machine 108 may be utilized by the controller 202 as the common point in both the 3D model of the machine 108 and the first 3D point cloud. Similarly, the controller 202 identifies other common points in both the 3D point cloud and the 3D model. In an embodiment, the controller 202 may utilize one or more computer vision techniques to identify common points in the first 3D point cloud and the 3D model of the machine 108. In an embodiment, the controller 202 may utilize Z-Scale Invariant Feature Transform (Z-SIFT), and Rotation invariant feature transform (RIFT), to identify the common points in the first 3D point cloud and the 3D model of the machine 108.

Those skilled in the art would appreciate that the scope of the disclosure is not limited to using the aforementioned computer vision techniques for determining the common points between the 3D point cloud and the 3D model of the machine 108. In an embodiment, the type of computer vision techniques being utilized may vary based on type of data received from the first sensor device 104*a*.

For example, when the first image (2D representation of the worksite 100) is received from the first sensor device 104*a* the controller 202 may utilize Scale Invariant Feature Transform (SIFT), Speeded Up Robust Features (SURF), and Multi-Scale Oriented Patches (MOP), to identify the common points in both the first image and the 3D model of the machine 108.

After the identification of the common points in the first 3D point cloud, the controller 202 utilizes Iterative closest point (ICP) technique to align the 3D model of the machine 108 and the first 3D point cloud. However, the scope of the disclosure is not limited to using the ICP technique to align the 3D model of the machine 108 and the first 3D point cloud. In an embodiment, various other techniques such as, Principal Component Analysis (PCA), Robust point matching (RPM), and Singular Value Decomposition (SVD), may be utilized to align the 3D model of the machine 108 and the first 3D point cloud. In an embodiment, the controller 202 determines a set of transformation parameters based on the alignment of the 3D model of the machine 108 with the first 3D point cloud. In an embodiment, the controller 202 is configured to utilize the set of transformation parameters to translate the coordinates of the points, in the first 3D point cloud, to the machine coordinate system. Hence, the controller 202 generates the transformed first 3D point cloud from the first 3D point cloud. The transformed first 3D point cloud is represented in the machine coordinate system.

At step 310, the second 3D point cloud (generated by the second sensor device 110) is aligned with the transformed first 3D point cloud to determine one or more transformation parameters. In an embodiment, the controller 202 is configured to align the second 3D point cloud with the transformed first 3D point cloud. Similar to the step 308, to align the two point clouds (i.e., the transformed first 3D point cloud and the second 3D point cloud), the controller 202 identifies common points that represent same object in both the 3D point clouds.

As discussed supra that the second 3D point cloud (generated by the second sensor device 110) includes the 3D point cloud of the terrain around the machine 108. Further, the transformed first 3D point cloud includes the 3D point cloud of the terrain around the machine 108 and the 3D point cloud of the machine 108 itself. Hence, the terrain is common object in both the 3D point clouds. Therefore, the controller 202 is configured to identify the common points that represent the terrain in both the 3D point clouds. In an embodiment, the controller 202 is configured to identify points that correspond to the one or more features of the terrain around the machine 108. For example, the controller 202 may identify points that correspond to the highwall 102*b* in the transformed first 3D point cloud. Similarly, the controller 202 may identify the points that correspond to the highwall 102*b* in the second 3D point cloud.

After identifying the common points in both the 3D point clouds, the controller 202 aligns the second 3D point cloud with the transformed first 3D point cloud based on the common points (corresponding to the one or more features of the terrain around the machine 108) identified in both the 3D point clouds. In the process, the controller 202 determines one or more transformation parameters. In an embodiment, the one or more transformation parameters may be utilized to translate coordinates of each point in the transformed first 3D point cloud to coordinates of the second 3D point cloud. Therefore, the controller 202 may utilize the one or more transformation parameters to transform the machine coordinates system, being used to represent the transformed first 3D point cloud, to the second coordinate system, being used to represent the second 3D point cloud. In an embodiment, the one or more transformation parameters may be represented as a transformation matrix.

At step 312, one or more calibration parameter are extracted from the one or more transformation parameters. In an embodiment, the controller 202 is configured to extract the one or more calibration parameters from the one or more transformation parameters. In a scenario, where the one or more transformation parameters are represented by the transformation matrix, the controller 202 may decompose the transformation matrix using one or more know matrix decomposition techniques to extract the one or more calibration parameters. A person skilled in the art will appreciate that matrix decomposition involves determination of one or more matrices, which when multiplied with each other generates the original matrix. In an embodiment, the one or more matrices determined based on the decomposition of the transformation matrix correspond to the one or more calibration parameters. In an embodiment, the one or more calibration parameters may include a pose of the second sensor device 110 with respect to the machine 108, a measure of yaw of the second sensor device 110 with respect to the machine 108, a measure of roll of the second sensor device 110 with respect to the machine 108, a measure of pitch of the second sensor device 110 with respect to the machine 108.

At step 314, the second sensor device 110 is calibrated based on the one or more calibration parameters. In an embodiment, the controller 202 is configured to calibrate the second sensor device 110. For example, the controller 202 may modify the orientation of the second sensor device 110 mounted on the machine 108 based on the one or more calibration parameters. For instance, if measure of yaw determined at step 312 is 10 degrees, the controller 202 may rotate the second sensor device 110 by 10 degrees along the vertical axis of the second sensor device 110.

Figure 4:
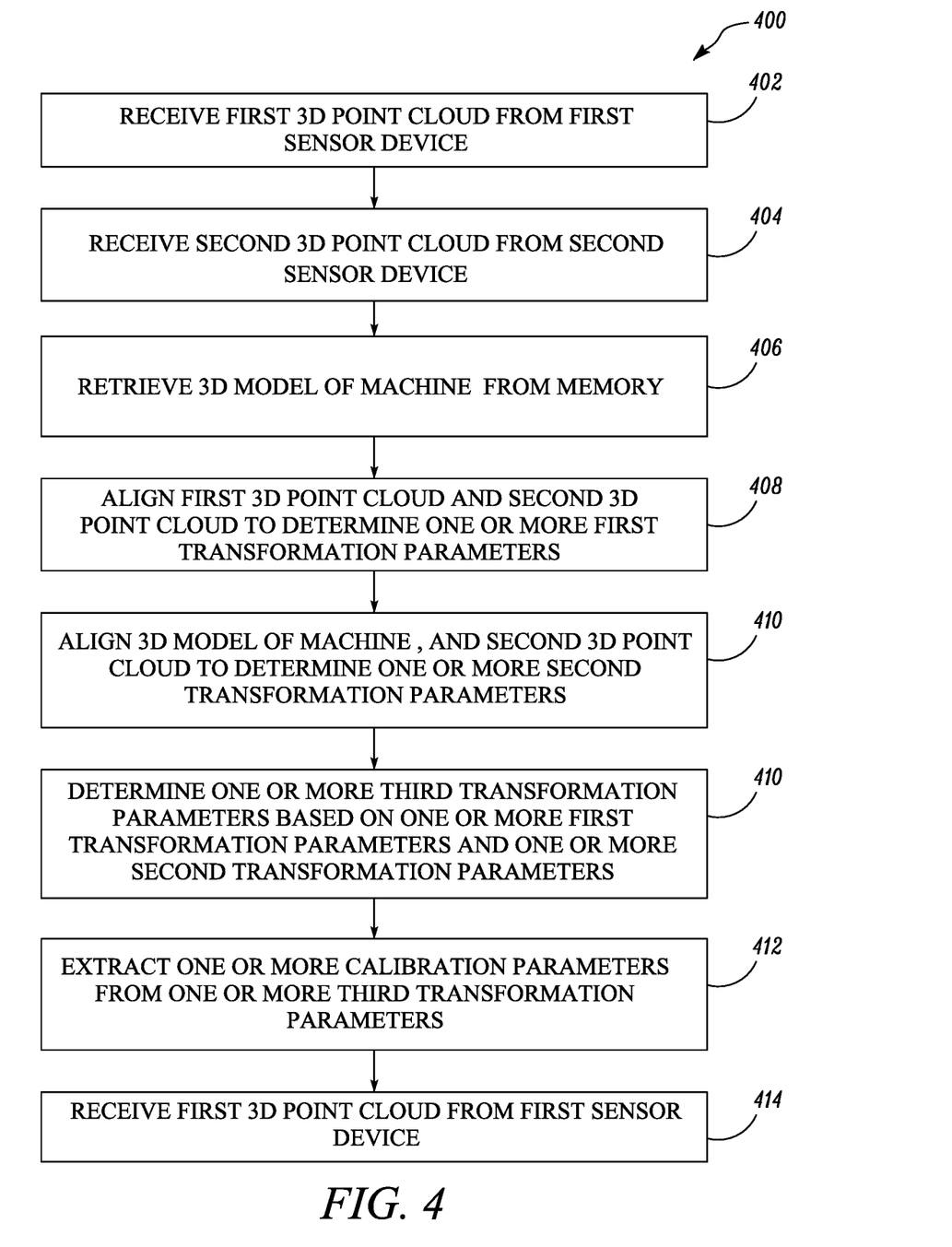
FIG. 4 illustrates a flowchart illustrating another method of calibrating a sensor mounted on a machine, in accordance with the concepts of the present disclosure.

Referring to FIG. 4, a flowchart 400 of method to calibrate the second sensor device 110 is illustrated. The flowchart 400 is described in conjunction with FIG. 1, FIG. 2, and FIG. 3.

At step 402, the first 3D point cloud is received from the first sensor device 104a. In an embodiment, the controller 202 is configured to receive the first 3D point cloud from the first sensor device 104a. In an embodiment, the process of receiving the first 3D point cloud is same as described in the step 302.

At step 404, the second 3D point cloud is received from the second sensor device 110. In an embodiment, the controller 202 is configured to receive the second 3D point cloud from the second sensor device 110. In an embodiment, the process of receiving the second 3D point cloud is same as described in the step 304.

At step 406, the 3D model of the machine 108 is retrieved from the memory device. In an embodiment, the controller 202 is configured to retrieve the 3D model of the machine 108 from the memory device in the controller 202. In an embodiment, the process of retrieving the 3D model of the machine 108 is same as described in the step 304.

At step 408, the first 3D point cloud and the second 3D point cloud are aligned to determine one or more first transformation parameters. In an embodiment, the controller 202 is configured to align the first 3D point cloud and the second 3D point cloud based on the one or more features of the terrain (captured in both the 3D point clouds). In an embodiment, the controller 202 may utilize the ICP technique to align the first 3D point cloud and the second 3D point cloud. Further, the controller 202 determine the one or more first transformation parameters based on the alignment of the first 3D point cloud and the second 3D point cloud.

At step 410, the 3D model of the machine 108 and the second 3D point cloud are aligned to determine one or more second transformation parameters. In an embodiment, the controller 202 is configured to align the 3D model of the machine 108, and the second 3D point cloud based on the one or more features of 3D model of the machine 108. As discussed above, the one or more features of the 3D model of the machine 108 includes coordinates of the structural features of the machine 108 depicted in the 3D model. In an embodiment, the controller 202 may utilize the ICP technique to align the 3D model of the machine 108, and the second 3D point cloud. Further, the controller 202 generates the one or more second transformation parameters based on the alignment of the 3D model of the machine 108, and the second 3D point cloud.

At step 412, one or more third transformation parameters are determined based on the one or more first transformation parameters and the one or more second transformation parameters. In an embodiment, the controller 202 is configured to determine the one or more third transformation parameters.

At step 414, the one or more calibration parameters are extracted from one or more third transformation parameters. In an embodiment, the controller 202 is configured to extract the one or more calibration parameters from the one or more third transformation parameters. As discussed supra that the one or more transformation parameters are represented as the transformation matrix. Therefore, the one or more third transformation parameters are also represented as the transformation matrix. In an embodiment, the controller 202 may utilize one or more known decomposition techniques to extract the one or more calibration parameters from the transformation matrix representing the one or more third transformation parameters.

At step 416, the second sensor device 110 is calibrated based on the one or more calibration parameters. In an embodiment, the controller 202 is configured to calibrate the second sensor device 110.

INDUSTRIAL APPLICABILITY

Figure 5:
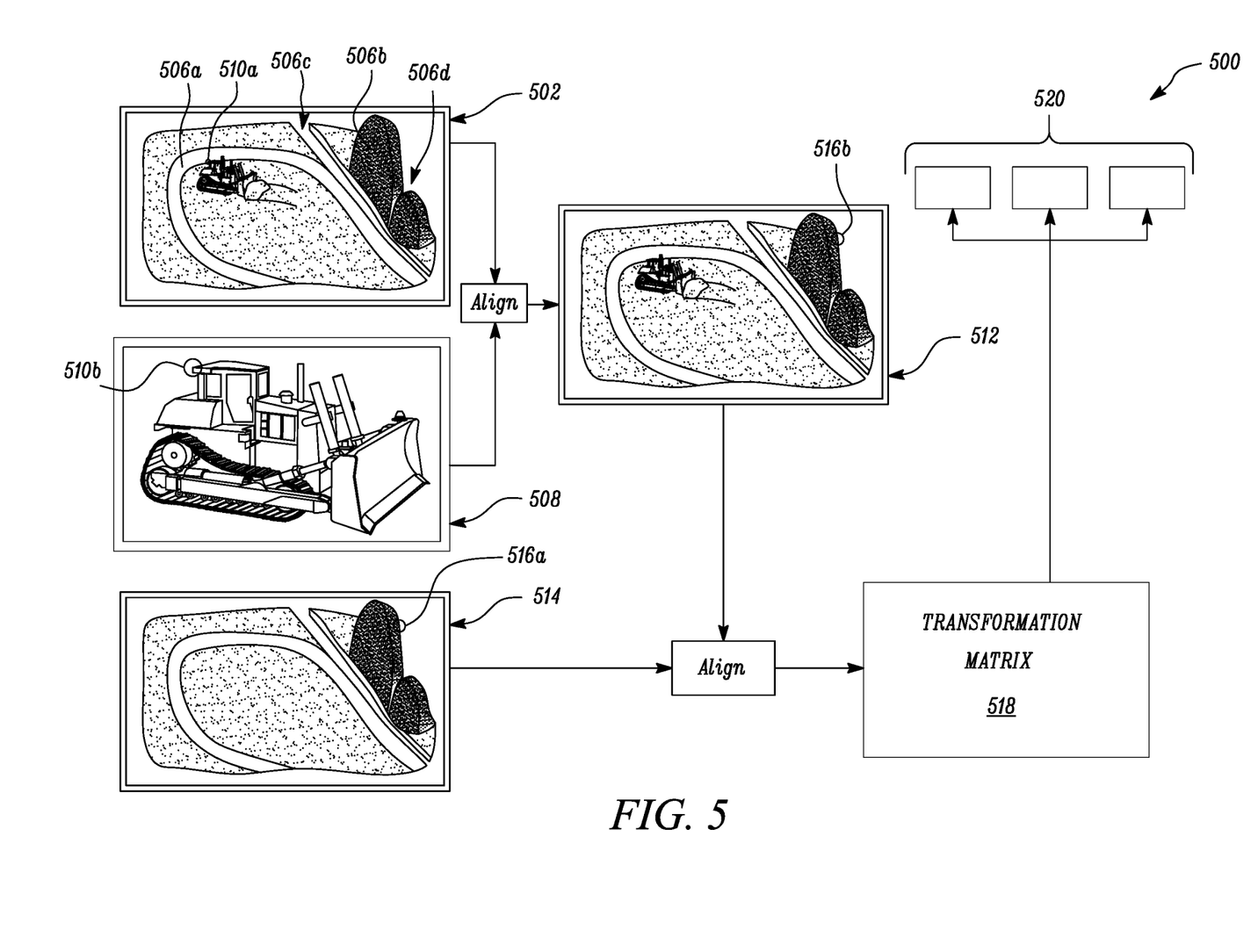
FIG. 5 illustrates an exemplary flow diagram illustrating process of calibrating a sensor mounted on a machine, in accordance with the concepts of the present disclosure.

Referring to FIG. 5, an exemplary scenario 500 to calibrate the second sensor device 110 is illustrated. To calibrate the second sensor device 110 (corresponding to the newly installed sensor), the machine 108 is driven to a predetermined location in the worksite 100. The predetermined location is such that the terrain around the predetermined location has the one or more features such as berms 102a, the highwall 102b, diches 102c, and crest 102d. Further, the first sensor device 104a is installed at the predetermined location 106a in the worksite 100. Further, the first sensor device 104a is installed at a predefined distance from the machine 108.

The first sensor device 104a scans the worksite 100 to generate the first 3D point cloud (hereinafter depicted by 502). The first 3D point cloud 502 includes 3D point cloud of the machine 108 (depicted by 504). Further, the first 3D point cloud includes 3D point cloud of the one or more features of the terrain (depicted by 506a, 506b, 506c, and 506d). Further, the first 3D point cloud 502 is represented in the first coordinate system. The first sensor device 104a transmits the first 3D point cloud 502 to the controller 202 in the machine 108. Thereafter, the controller 202 retrieves the 3D model of the machine (depicted by 508) from the memory device in the controller 202. The 3D model of the machine (depicted by 508) is represented in the machine coordinate system.

The controller 202 aligns the 3D model of the machine (depicted by the 508) with the first 3D point cloud 502. To align, the controller 202 identifies common points in the first 3D point cloud 502 that correspond to a point in the 3D model of the machine (depicted by 508). For example, the controller 202 identifies the point 510a in the first 3D point cloud 502, and the point 510b in the 3D model of the machine (depicted by 508). The points 510a and 510b correspond to the roof of the machine 108 in the first 3D point cloud 502 and the 3D model of the machine (depicted by 508), respectively.

After identifying the common points, the controller 202 may utilize the ICP technique to transform the first coordinate system of the first 3D point cloud 502, to the machine coordinates. The transformed first 3D point cloud has been depicted by 512.

The controller 202 instructs the second sensor device 110 to scan the worksite 100 to generate the second 3D point cloud (represented by 514). The second 3D point cloud 514 is in a second coordinate system. The second 3D point cloud 514 includes the 3D point cloud of the one or more features of the terrain around the machine 108. Thereafter, the controller 202 identifies points representing the one or more features of the terrain in the second 3D point cloud 514. For example, the controller 202 identifies the point 516a corresponding to the highwall 102b. Further, the controller 202 identifies the point 516b in the transformed first 3D point cloud 512 corresponding the highwall 102b.

After identification of the points representing same objects in both the 3D point clouds, the controller 202 aligns the transformed first 3D point cloud 512 with the second 3D point cloud 514 to generate the transformation matrix (depicted by 518). As discussed above, the transformation matrix 518 corresponds to the one or more transformation parameters. The controller 202 may utilize the transformation matrix 518 to transform the machine coordinates (being used to represent the transformed first 3D point cloud 512) to the second coordinate system (being used to represent the second 3D point cloud 514).

The controller 202 decomposes the transformation matrix 518 to determine the one or more calibration parameters 520 for the second sensor device 110. The controller 202 modifies one or more of yaw, pitch, and roll of the second sensor device 110 based on the one or more calibration parameters.

The disclosed embodiments encompass numerous advantages. As there is no need to send the machine to the service station for calibrating the newly installed sensor, the time delay incurred due to calibration of the sensors is reduced. Further, the disclosed embodiments do not require the technician working at the worksite to have the knowledge pertaining to the image processing to calibrate the newly installed sensor.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for calibrating sensor devices mounted on a machine in a worksite, the machine having an associated machine coordinate system, the method comprising:
    generating, with a first sensor, a first 3D point cloud of the machine and a three dimensional terrain feature in the worksite arranged apart from the machine in the worksite, the first 3D point cloud being represented in a second coordinate system and the first sensor being configured to scan the machine and the three dimensional terrain feature;
    transforming, by a controller, the first 3D point cloud to generate a transformed first 3D point cloud in the machine coordinate system based on an alignment of the first 3D point cloud with a 3D model of the machine using a structural feature of the machine common to both the first 3D point cloud and the 3D model of the machine;
    generating, with a second sensor mounted on the machine, a second 3D point cloud including the three dimensional terrain feature in the worksite, the second 3D point cloud being represented in the machine coordinate system;
    aligning, by the controller, a second 3D point cloud with the transformed first 3D point cloud based on the 3D terrain feature in the worksite common to both the first 3D point cloud and the second 3D point cloud, to determine one or more transformation parameters;
    extracting, by the controller, one or more calibration parameters for the second sensor device from the one or more transformation parameters; and
    calibrating, by the controller, the second sensor device based on the one or more calibration parameters.

2. The method of claim 1, wherein the first sensor device is installed at a predetermined location in the worksite away from the machine.

3. The method of claim 1, wherein the first sensor device is mounted on an unmanned aerial vehicle (UAV), wherein the UAV is configured to scan the worksite to generate the first 3D point cloud.

4. The method of claim 1, wherein the 3D model of the machine is represented in the machine coordinate system.

5. The method of claim 1, wherein the one or more 3D terrain features comprises one or more of berms, highwalls, ditches, and crests.

6. The method of claim 1, wherein the first sensor device and the second sensor device correspond to at least one of a perception sensor, LIDAR sensor, and an image capturing sensor.

7. The method of claim 1, wherein the one or more calibration parameters comprises one or more of a pose of the second sensor device with respect to the machine, a measure of yaw of the second sensor device with respect to the machine, a measure of roll of the second sensor device with respect to the machine, a measure of pitch of the second sensor device with respect to the machine.

8. A calibration system for a machine operating in a worksite, the machine having an associated machine coordinate system, the calibration system comprising:
    a first sensor device arranged apart from the machine in the worksite and configured to generate a first 3D point cloud represented in a second coordinate system comprising the machine and a 3D terrain feature of a terrain around the machine;

a second sensor device, mounted on the machine, configured to generate a second 3D point cloud represented in the machine coordinates system comprising the 3D terrain feature around the machine; and a controller configured to:

transform the first 3D point cloud to generate a transformed first 3D point cloud in the machine coordinate system based on an alignment of the first 3D point cloud with a 3D model of the machine using a structural feature of the machine common to both the first 3D point cloud and the 3D model of the machine, align the second 3D point cloud with the transformed first 3D point cloud based on the 3D terrain feature, to determine one or more transformation parameters, extract one or more calibration parameters for the second sensor device from the one or more transformation parameters, and calibrate the second sensor device based on the one or more calibration parameters.

9. The calibration system of claim 8, wherein the 3D model of the machine is represented in the machine coordinate system.

10. The calibration system of claim 8, wherein the first sensor device and the second sensor device correspond to at least one of a perception sensor, a LIDAR sensor, and an image capturing sensor.

11. A machine being operable on a worksite, the machine having an associated machine coordinate system, the machine comprising:

a transceiver configured to receive a first 3D point cloud from a first sensor device arranged apart from the machine, wherein the first 3D point cloud is represented in a second coordinated system and comprises the machine a 3D terrain feature around the machine;

a second sensor device, mounted on the machine, configured to generate a second 3D point cloud represented in the machine coordinated system comprising the 3D terrain feature around the machine; and a controller configured to:

transform the first 3D point cloud to the machine coordinate system to generate a transformed first 3D point cloud represented in the machine coordinate system based on an alignment of the first 3D point cloud with a 3D model of the machine using a structural feature of the machine common to both the first 3D point cloud and the 3D model of the machine, align the second 3D point cloud with the transformed first 3D point cloud based on the 3D terrain feature, to determine one or more transformation parameters, extract one or more calibration parameters for the second sensor device from the one or more transformation parameters, and calibrate the second sensor device based on the one or more calibration parameters.

12. The machine of claim 11, wherein the 3D model of the machine is represented in the machine coordinate system.

* * * * *